United States Patent
Richards et al.

(10) Patent No.: US 10,938,897 B2
(45) Date of Patent: Mar. 2, 2021

(54) EXTENDED GROUP SERVICE CHANGES

(71) Applicant: EMC IP Holding Company LLC, Hopkinton, MA (US)

(72) Inventors: Antony Richards, Rose Bay (AU); Ron Steinke, Tacoma, WA (US); Suraj Raju, Issaquah, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/263,130

(22) Filed: Jan. 31, 2019

(65) Prior Publication Data
US 2020/0252452 A1 Aug. 6, 2020

(51) Int. Cl.
| G06F 9/52 | (2006.01) |
| H04L 29/08 | (2006.01) |
| G06F 16/182 | (2019.01) |
| G06F 16/176 | (2019.01) |

(52) U.S. Cl.
CPC .......... H04L 67/1059 (2013.01); G06F 9/52 (2013.01); G06F 16/1774 (2019.01); G06F 16/182 (2019.01); H04L 67/1044 (2013.01); H04L 67/34 (2013.01)

(58) Field of Classification Search
CPC ... G06F 16/23–2343; G06F 16/27–278; G06F 16/176–1774; G06F 16/182–1844; G06F 16/1744; G06F 9/52–528; H04L 67/1044; H04L 67/1059
See application file for complete search history.

(56) References Cited

U.S. PATENT DOCUMENTS

| | | | |
|---|---|---|---|
| 5,555,388 A * | 9/1996 | Shaughnessy | G06F 16/1774 711/100 |
| 6,523,078 B1 * | 2/2003 | Desai | G06F 9/526 710/200 |
| 6,965,936 B1 * | 11/2005 | Wipfel | G06F 11/1482 709/201 |
| 7,490,089 B1 * | 2/2009 | Georgiev | G06F 11/203 |
| 8,041,735 B1 * | 10/2011 | Lacapra | G06F 16/13 707/783 |
| 9,747,323 B1 * | 8/2017 | Kilpatrick | G06F 16/1774 |
| 2004/0220913 A1 * | 11/2004 | Walker | G06F 9/52 |
| 2004/0220933 A1 * | 11/2004 | Walker | G06F 9/466 |
| 2005/0021793 A1 * | 1/2005 | Kubsch | H04L 61/2069 709/229 |
| 2005/0278483 A1 * | 12/2005 | Andruszkiewicz | G06F 11/1076 711/114 |
| 2006/0291459 A1 * | 12/2006 | Bain | G06F 11/2028 370/389 |
| 2007/0011282 A1 * | 1/2007 | Alex | G06F 16/27 709/220 |
| 2007/0271365 A1 * | 11/2007 | Revanuru | H04L 67/325 709/223 |

(Continued)

Primary Examiner — David R Lazaro
Assistant Examiner — Julian Chang
(74) Attorney, Agent, or Firm — Amin, Turocy & Watson, LLP

(57) ABSTRACT

Extended group service changes are facilitated in a data storage system. Node devices of a data storage system are identified that are merging into a cluster of the node devices. In response to the identifying, respective merge locks are caused at a group of the node devices that are sending service updates.

20 Claims, 11 Drawing Sheets

(56) References Cited

U.S. PATENT DOCUMENTS

| | | | | |
|---|---|---|---|---|
| 2007/0294577 | A1* | 12/2007 | Fiske | G06F 11/203 |
| | | | | 714/13 |
| 2008/0010490 | A1* | 1/2008 | Revanuru | G06F 11/2028 |
| | | | | 714/4.1 |
| 2008/0077635 | A1* | 3/2008 | Sporny | G06F 16/1834 |
| 2012/0209808 | A1* | 8/2012 | Tien | H04L 67/1095 |
| | | | | 707/622 |
| 2012/0259820 | A1* | 10/2012 | Patwardhan | G06F 16/1774 |
| | | | | 707/674 |
| 2014/0122718 | A1* | 5/2014 | Thoppai | G06F 16/2343 |
| | | | | 709/225 |
| 2014/0149365 | A1* | 5/2014 | Minborg | G06F 16/27 |
| | | | | 707/692 |
| 2014/0149783 | A1* | 5/2014 | Georgiev | G06F 11/0793 |
| | | | | 714/4.2 |
| 2015/0350318 | A1* | 12/2015 | Van Assche | H04L 67/1095 |
| | | | | 709/202 |
| 2015/0370228 | A1* | 12/2015 | Kohn | G06Q 50/06 |
| | | | | 700/31 |
| 2016/0105323 | A1* | 4/2016 | Haeupler | H04L 47/70 |
| | | | | 709/224 |
| 2016/0117336 | A1* | 4/2016 | Aron | G06F 16/1767 |
| | | | | 707/688 |
| 2016/0364406 | A1* | 12/2016 | Brown | G06F 11/2046 |
| 2017/0116095 | A1* | 4/2017 | Schatz | G06F 11/2033 |
| 2017/0271984 | A1* | 9/2017 | Kohn | H02M 3/156 |
| 2017/0371747 | A1* | 12/2017 | Bortnikov | G06F 16/278 |
| 2018/0332547 | A1* | 11/2018 | Liu | H04W 8/005 |
| 2019/0251848 | A1* | 8/2019 | Sivanesan | H04W 76/27 |
| 2020/0026810 | A1* | 1/2020 | Subramaniam | G06F 1/3206 |
| 2020/0364095 | A1* | 11/2020 | Luo | G06F 9/52 |

\* cited by examiner

EXTENDED GROUP SERVICE CHANGES

TECHNICAL FIELD

The present application relates generally to extended group service changes to node(s) of a data storage system.

BACKGROUND

As the number of node devices, e.g., computers, within a storage group, e.g., cluster, grows, scaling issues present themselves. Existing mechanisms can synchronize state changes, but the existing mechanisms are overkill for many purposes and may not allow concurrency. Consequently, conventional storage technologies have had some drawbacks, some of which may be noted with reference to the various embodiments described herein below.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments herein, devices, systems, methods, apparatus and/or computer program products that facilitate extended group service changes are provided.

According to one embodiment, a system is provided. The system can comprise a processor and a memory. The memory can store executable instruction that, when executed by the processor, facilitate performance of operations. The performance of operations can comprise identifying node devices of a data storage system that are merging into a cluster of the node devices. The performance of operations can further comprise, in response to the identifying, causing respective merge locks at a group of the node devices that are sending service updates.

According to another embodiment, a method is provided. The method can comprise identifying, by a system operatively coupled to a processor, node devices of a data storage system that are merging into a cluster of the node devices. The method can further comprise, in response to the identifying, causing, by the system, respective merge locks at a group of the node devices that are sending service updates.

According to another embodiment, a computer program product is provided. The computer program product can comprise a computer readable storage medium having program instructions embodied therewith. The program instructions can be executable by a processor to cause the processor to at least identify node devices of a data storage system that are merging into a cluster of the node devices. The program instructions can be executable by a processor to cause the processor to at least, in response to the identifying, cause respective merge locks at a group of the node devices that are sending service updates.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which.

DETAILED DESCRIPTION

Figure 1:
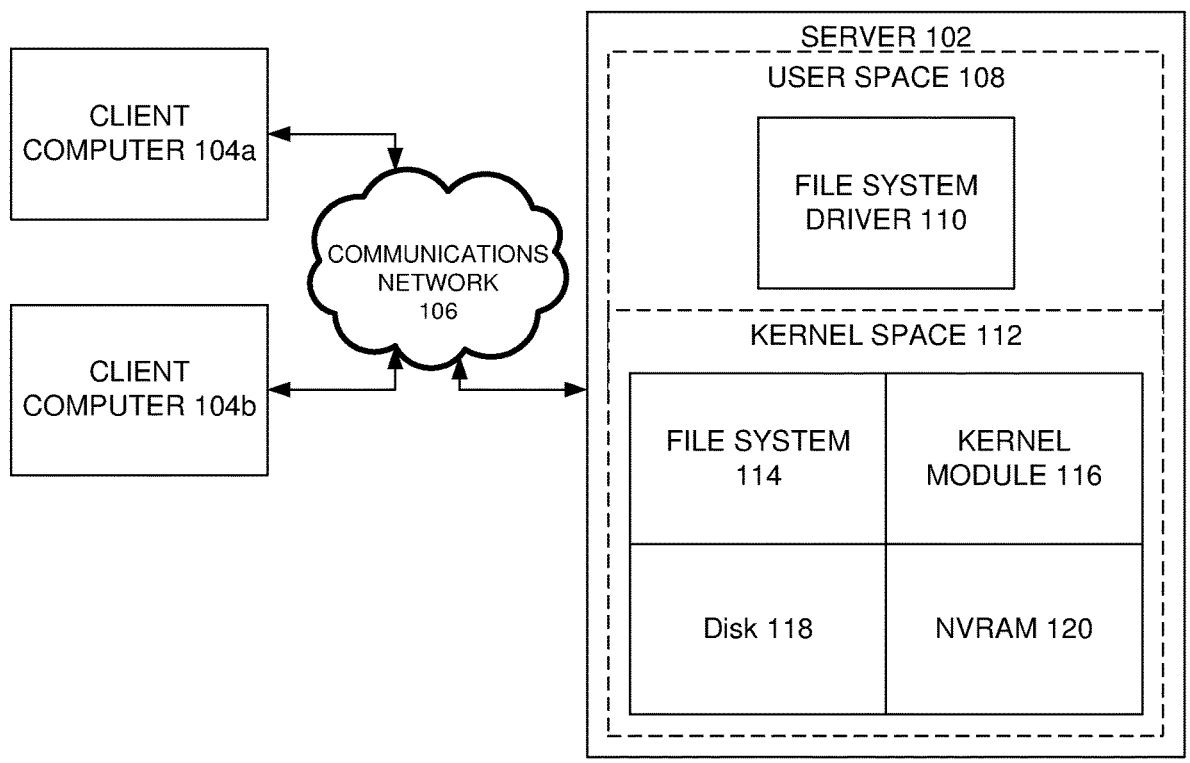
FIG. 1 illustrates a block diagram of an example, non-limiting system facilitating extended group service changes in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloud" as used herein can refer to a cluster of nodes (e.g., set of network servers), for example, within a distributed object storage system, that are communicatively and/or operatively coupled to each other, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

Distributed computing is a field of computer science that studies distributed systems. A distributed system is a system whose components can be located on different networked computers, which then communicate and coordinate their actions by passing messages to one another. The components can interact with one another in order to achieve a common goal. In distributed computing, a problem can be divided into many tasks, each of which can be solved by one or more computers, which communicate with each other via message passing.

As described herein, in distributed computing, a distributed storage system can have an operating system. The operating system can provide updates to one or more remote computers about changes to files in the distributed storage system, using an application-layer network protocol. The present disclosure generally describes embodiments where the distributed storage system can be an EMC Isilon Cluster distributed storage system, and the operating system can be a OneFS operating system (and file system). It can be appreciated that there are other embodiments that utilize different technologies than described herein.

As mentioned, as the number of node devices (e.g., computers) within an EMC Isilon Cluster (e.g., generally, cluster) grows, scaling issues result. Existing mechanisms can synchronize state changes, but the existing mechanisms can be heavier than needed for many purposes and may not allow concurrency. The proposed lightweight messaging allows the service group changes to be updated asynchronously between the node devices. The proposed lightweight messaging can greatly simplify control messaging which allows the size of the cluster to grow.

A publishing mechanism can be added for lighter weight state changes for which a particular node device can be the authoritative source. This method of messaging could allow the state of a group management protocol (GMP) service to be updated to the node devices of a cluster independently to the updates to the other node devices on the cluster resulting in greater efficiency of the inter-node device control system. The change can mean that the node devices in a cluster may no longer need to be changed in lock-step.

The node device that initiates service change can be known as the initiator node device. All node devices that respond to the initiator node device can be known as participant node devices. The initiator node device can send service updates to all the node devices in the cluster. Races between node devices merging and sending service updates can be prevented by employing merge locks (e.g., exclusive merge locks or shared merge locks), which is required by the initiator node devices for sending service updates and also required by all the node devices in a merge operation (e.g., generally, merge). More specifically, a service update (e.g., which employs shared merge locks) can prevent the merge operation (e.g., which employs exclusive merge locks) from completing because merging also requires a merge lock on every node, including the node device initiating the service change, during the publication of the changes so that all the node devices can synchronize their state. There is no need to prevent races with node devices splitting because either the service change happens first and a short time later the node device is marked as down meaning that all services are down, or the node device is marked as down and any following service changes for that node device are ignored.

Once the shared merge lock is obtained, a service update can be sent to every participant node device. The participant node devices can receive the service change (e.g., service update) request and send updates on the service that has changed. The participant node devices can reply to the initiator node device that the change has been successfully updated. The initiator node device can wait until all participant node devices have replied to release the shared merge lock, and the service change is now complete.

When node devices that were down come up and synchronize their state using existing heavy weight mechanisms, they need to synchronize service state previously published. In one or more embodiments described herein, service state exchange can be employed so that, when a new node device joins a cluster, the new node device knows the state of all the services on all the node devices in the cluster. It can be appreciated that multiple node devices can join the cluster at the same time. For example, in a merge operation, a node device can nominate a set of node devices to be merged together. Once the node devices in the merge have agreed to the merge operation, the node devices are then ready to proceed by causing or activating the exclusive merge locks at all the node devices in the merge operation (e.g., to prevent service changes from happening at the same time). All the node devices can send the state of its service to all the node devices that are new to the cluster, e.g., service exchange. The node devices can wait until the state of the services of all the new node devices are received to complete the merge operation. At the end of the merge operation, the exclusive merge locks can be released on all the node devices allowing any blocked service updates or service changes to be completed.

A GMP can manage which node devices are currently up and which node devices are currently down (e.g., dynamic node device configuration). For example, a "system pending shutdown" status, called a drain, can be advertised to a group of node devices within a distributed node device system. A flag can be added to node device management data (e.g., drain service) to indicate which node device will be down. When the flag exists for a node device, other node devices can then have the opportunity to begin processing data in a manner that can mitigate the effect of the node device being down. When a node device is going out of service, it can advertise to the group that it is going out of service.

The group management system (e.g., GMP) is part of a kernel for figuring out which node devices are up or down. This is where the drain services can be advertised. Once the drain services are advertised by one node device, other node devices can acknowledge that the drain service is up. Thus, any interested processes associated with the node devices can receive notifications of a group change occurring (e.g., a service group change). The node devices can query to read a chunk of memory from the kernel that indicates what the current group looks like to find out whether the service group change in question is one where the drain service commenced or terminated.

FIG. 1 illustrates a block diagram of an example, non-limiting system 100 facilitating extended group service changes in accordance with one or more embodiments described herein. System 100 comprises server 102, client computer 104a, client computer 104b, and communications network 106. The client computer 104a and client computer 104b can be implemented using aspects of computer 1102 of FIG. 11. Communications network 106 can comprise a computer communications network, such as the Internet. Server 102 can be implemented using aspects of distributed file storage system 1000 of FIG. 10 and computer 1102 of FIG. 11. It can be appreciated that server 102 is presented logically, and that there can be embodiments where server 102 comprises multiple computers. In some examples, server 102 can implement a OneFS operating system, or an installable file system (IFS).

As depicted, server 102 can comprise user space 108, file system driver 110, kernel space 112, file system 114, kernel module 116, disk 118, and non-volatile random-access memory (NVRAM) 120. User space 108 can generally be a portion of system memory of server 102 in which user processes run. Then, kernel space 112 can generally be a portion of system memory of server 102 in which kernel processes run.

File system driver 110 can comprise a computer device driver that provides access to a file system of server 102 to one or more applications or modules of server 102. For example, requests to read from and write can be sent to file system 114 via file system driver 110. File system 114 can comprise an organization of data on server 102 into one or more files and/or directories that can contain files. Kernel module 116 can provide some operating system functions for server 102, such as file management and resource allocation. File system 114 can store one or more files in disk 118 and NVRAM 120. In some examples, files of file system 114 can generally be stored on disk 118, while metadata blocks and corresponding delta descriptor files can be stored in NVRAM 120.

Server 102 can store and maintain one or more computer files, which can, in turn, be accessed by client computer 104*a* and/or client computer 104*b*. Client computer 104*a* and/or client computer 104*b* can access these files on server 102 via a server message block (SMB) protocol. In some examples, client computer 104*a* and/or client computer 104*b* can send server 102 requests to perform transactions that include modifying a file of server 102. When server 102 receives a request to perform a transaction that includes modifying a file, this request can be directed to file system driver 110. File system driver 110 can communicate with kernel module 116, which can be responsible for receiving file change events and implementing those events (e.g., modifying a file).

Upon receiving or identifying file change events, service updates or extended group service changes, exclusive merge locks and shared merge locks can be activated. Exclusive merge locks and shared merge locks can be used to prevent service updates and merging operation from occurring at the same time. Shared merge locks can be activated at the initiator nodes for service updates. It can be appreciated that multiple node devices can change services at the same time and multiple service changes can occur on the same node device. The activation of the shared merge locks can prevent the merge operation from completing because the merge operation also requires the merge locks (e.g., exclusive merge locks) to be activated on every node device, including the node devices initiating service changes, during the publication of the service change so that all the node devices can synchronize their service state.

For example, upon identifying node devices of a data storage system that are merging into a cluster of node devices, respective exclusive merge locks can be caused or activated at a group of the node devices that are sending service updates. Furthermore, upon identifying a node device or a group of node devices of a data system that are sending service updates within a cluster of node devices, respective shared merge locks can be caused or activated at the node device or the group of node devices. The respective exclusive merge locks and respective shared merge locks can be respectively comprised in the group of the node devices, and wherein the causing or activating the respective exclusive merge locks or respective shared merge locks can comprise facilitating respective initiation of the respective exclusive merge locks or shared merge locks at the group of the node devices. The group of the node devices can send service updates independently. The group of node devices in a cluster of node devices can send service updates to the node devices that have merged into the cluster of node devices, e.g., service exchange. It is appreciated that splitting the group of node devices from the cluster of node devices does not have synchronization issues because either order (service updates or merge operation) results in the services being down.

Figure 2:
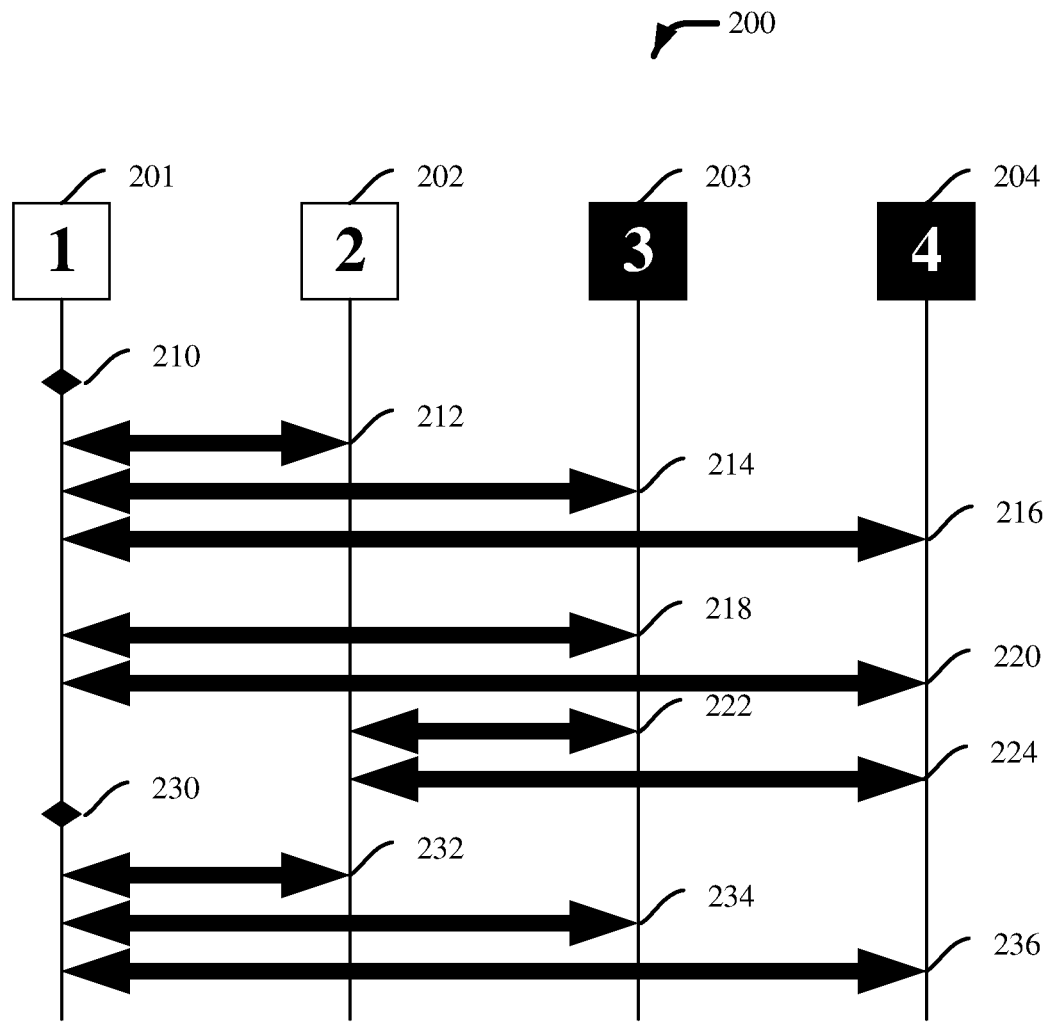
FIG. 2 illustrates a block diagram of an example, non-limiting merge operation facilitating extended group service changes in accordance with one or more embodiments described herein.

FIG. 2 illustrates a block diagram of an example, non-limiting merge operation 200 facilitating extended group service changes in accordance with one or more embodiments described herein. FIG. 2 illustrates node 1 device 201 and node 2 device 202 are a cluster, node 3 device 203 and node 4 device 204 are a cluster, and node 1 device 201 and node 2 device 202 are merging with node 3 device 203 and node 4 device 204. The merge operation is initiated at node 1 device 201 just before diamond shape 210. Once all the nodes in the merge have agreed to the merge operation, the merge operation is ready to proceed. Wide arrow 212 can represent node 1 device 201 serializing (e.g., publishing or messaging) the merge operation to node 2 device 202 to activate the merge lock. Diamond shape 210 can represent node 1 device 201 serializing the merge operation to itself being node 1 device 201 to activate the exclusive merge lock. Wide arrow 214 can represent node 1 device 201 serializing the merge operation to node 3 device 203 to activate the exclusive merge lock. Wide arrow 216 can represent node 1 device 201 serializing the merge operation to node 4 device 204 to activate the exclusive merge lock. The exclusive merge locks can be activated on all the nodes to prevent service changes from happening at the same time as the merge operation. Wide arrows are used to represent that multiple messages can be exchanged.

The nodes can send the state of its services to all the nodes that are new to the cluster. For example, wide arrow 218, wide arrow 220, wide arrow 222 and wide arrow 224 can represent the service exchange (e.g., service state exchange) between the respective nodes that are new to the cluster. More specifically, wide arrow 218 can represent node 1 device 201 sending its service state to node 3 device 203 and receiving the service state from node 3 device 203. Wide arrow 220 can represent node 1 device 201 sending its service state to node 4 device 204 and receiving the service state from node 4 device 204. Wide arrow 222 can represent node 2 device 202 sending its service state to node 3 device 203 and receiving the service state from node 3 device 203. Wide arrow 224 can represent node 2 device 202 sending its service state to node 4 device 204 and receiving the service state from node 4 device 204. There are no wide arrows connecting node 1 device 201 and node 2 device 202 to represent service exchange as these nodes are in the same cluster and already know the service state of the other. Likewise, node 3 device 203 and node 4 device 204 are in the same cluster and already know the service state of the other, so there are no wide arrows connecting these nodes to represent service exchange. There is no need to send the current service state to any node that was in the group prior to the merge operation. The nodes can wait until the service state of all the new nodes have been received. Once the service state exchange has finished, all the nodes in the cluster know the current state of all the services in the cluster.

Diamond shape 230 can represent the messaging between node 1 device 201 and itself, node 1 device 201, that the service exchange has finished, and the exclusive merge lock is released. Bidirectional arrow 232 can represent the messaging between node 1 device 201 and node 2 device 202 that the service exchange has finished, and the exclusive merge lock is released. Bidirectional arrow 234 can represent the messaging between node 1 device 201 and node 3 device 203 that the service exchange has finished, and the exclusive merge lock is released. Bidirectional arrow 236 can represent the messaging between node 1 device 201 and node 4 device 204 that the service exchange has finished, and the exclusive merge lock is released. At the end of the merge operation, the exclusive merge locks on all the nodes can be released allowing any blocked service updates to be completed.

Figure 3:
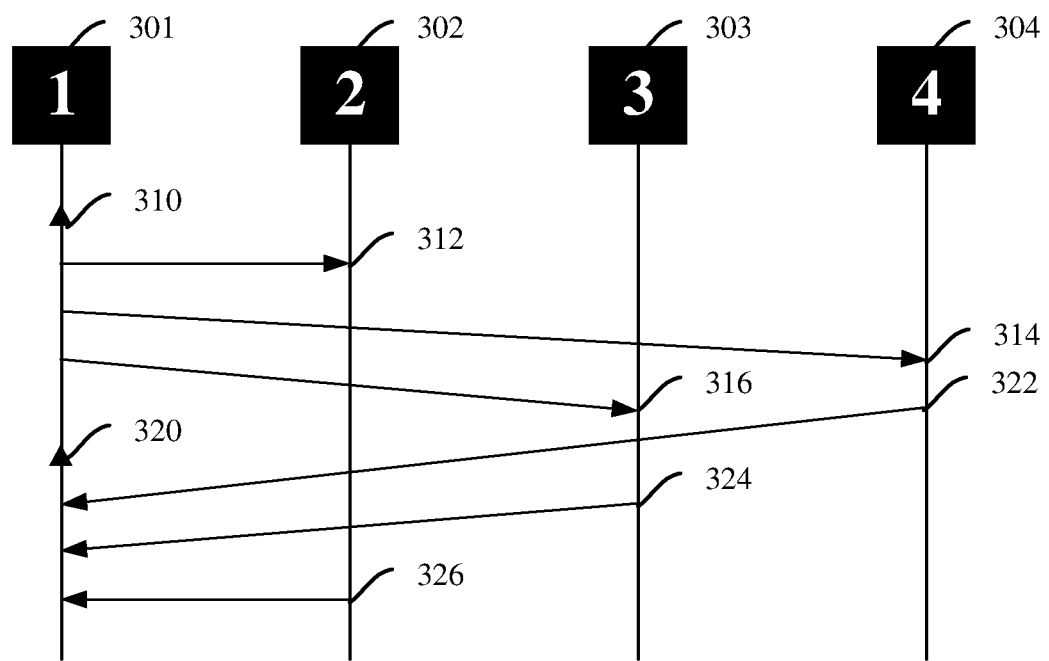
FIG. 3 illustrates a block diagram of an example, non-limiting service update facilitating extended group service changes in accordance with one or more embodiments described herein.

FIG. 3 illustrates a block diagram of an example, non-limiting service update 300 facilitating extended group service changes in accordance with one or more embodiments described herein. FIG. 3 illustrates initiator node 1 device 301 activating a shared merge lock to initiate a service update or service change within a cluster comprising initiator node 1 device 301, participant node 2 device 302, participant node 3 device 303 and participant node 4 device 304. Arrowhead 310 can represent the initiation of service update by initiator node 1 device 301. Arrow 312 can represent initiator node 1 device 301 sending a service update to participant node 2 device 302. Arrow 314 can represent initiator node 1 device 301 sending a service update to participant node 4 device 304. Arrow 316 can represent initiator node 1 device 301 sending a service update to participant node 3 device 303.

Arrowhead 320 can represent the messaging loopback to initiator node 1 device 301. Arrow 322 can represent participant node 4 device 304 replying to initiator node 1 device 301 that the service change has been successfully updated. Arrow 324 can represent participant node 3 device 303 replying to initiator node 1 device 301 that the service change has been successfully updated. Arrow 326 can represent participant node 2 device 302 replying to initiator node 1 device 301 that the service change has been successfully updated. The service update or service change can be complete after participant node 2 device 302 replies, which is the last node in the cluster to reply. Initiator node 1 device 301 can wait until all participant nodes have replied to release the shared merge lock, and the service update or service change can be complete. Although not shown here in FIG. 3, it can be appreciated that multiple node devices can change services at the same time and multiple service changes can occur on the same node device.

Furthermore, it can be appreciated that the node devices can finish its operation independently of the other node devices. For example, participant node 3 device 303 can reply to initiator node 1 device 301 that the service change has been successfully updated independent of whether participant 2 node device 302 or participant 4 node device 304 have finished updating. Similarly, if different sets of node devices initiate service changes, those sets of node devices can finish its operation independently of the other sets of node devices. By not serializing or locking the operation of a node device based on other node devices (e.g., based on whether the operations have completed), scaling issues can be fixed. Stopping GMP messaging on all nodes to serialize or lock the operation can be expensive. Although the service update or service change described are not synchronized, the service update or service change results are still the same. The caller of the service change does not have to return until all the node devices have been updated. Once all the node devices have replied, the service change can be complete.

Figure 4:
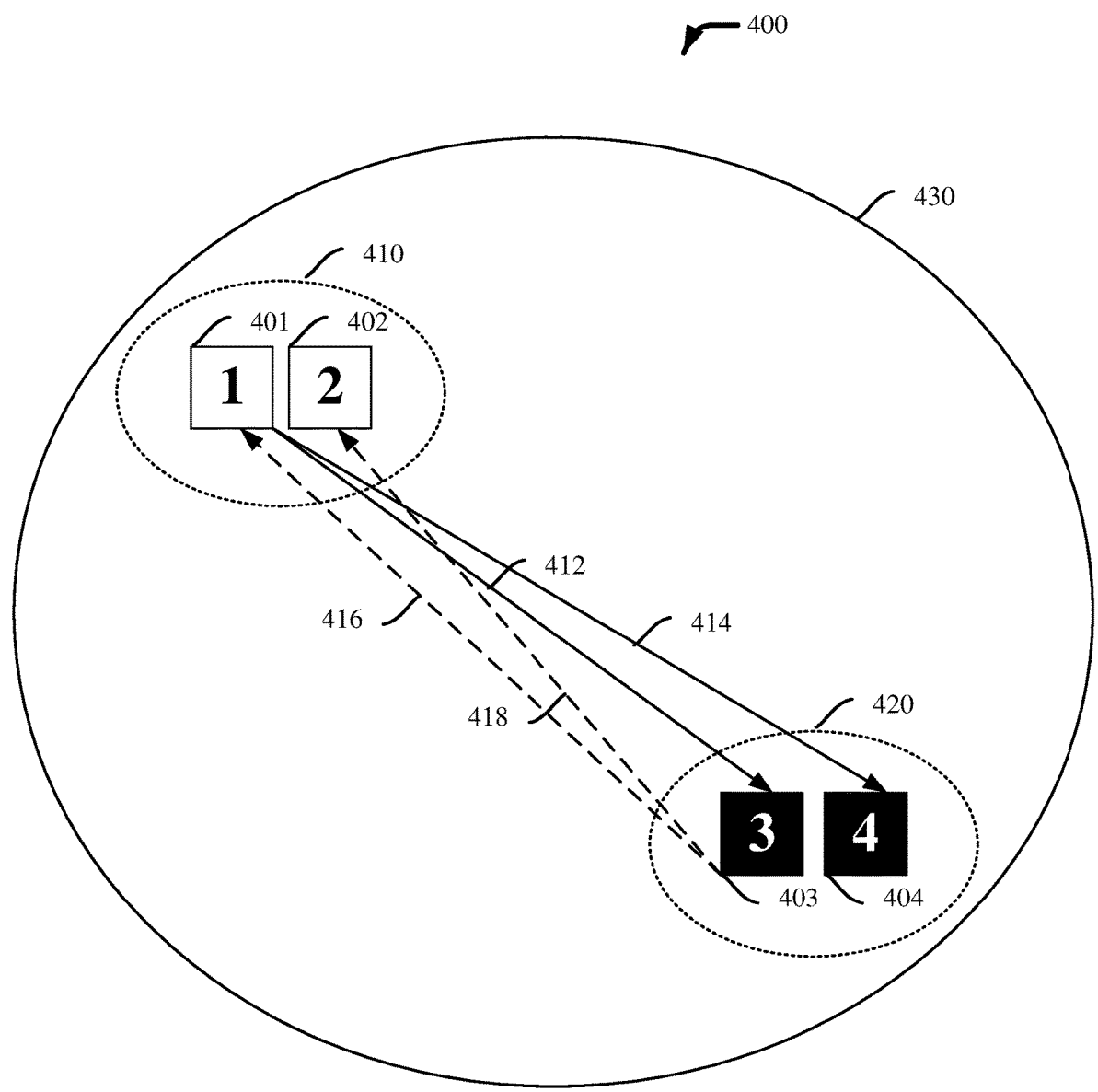
FIGS. 4-5 illustrate block diagrams of example, non-limiting merge operations facilitating extended group service changes in accordance with one or more embodiments described herein.
Figure 5:
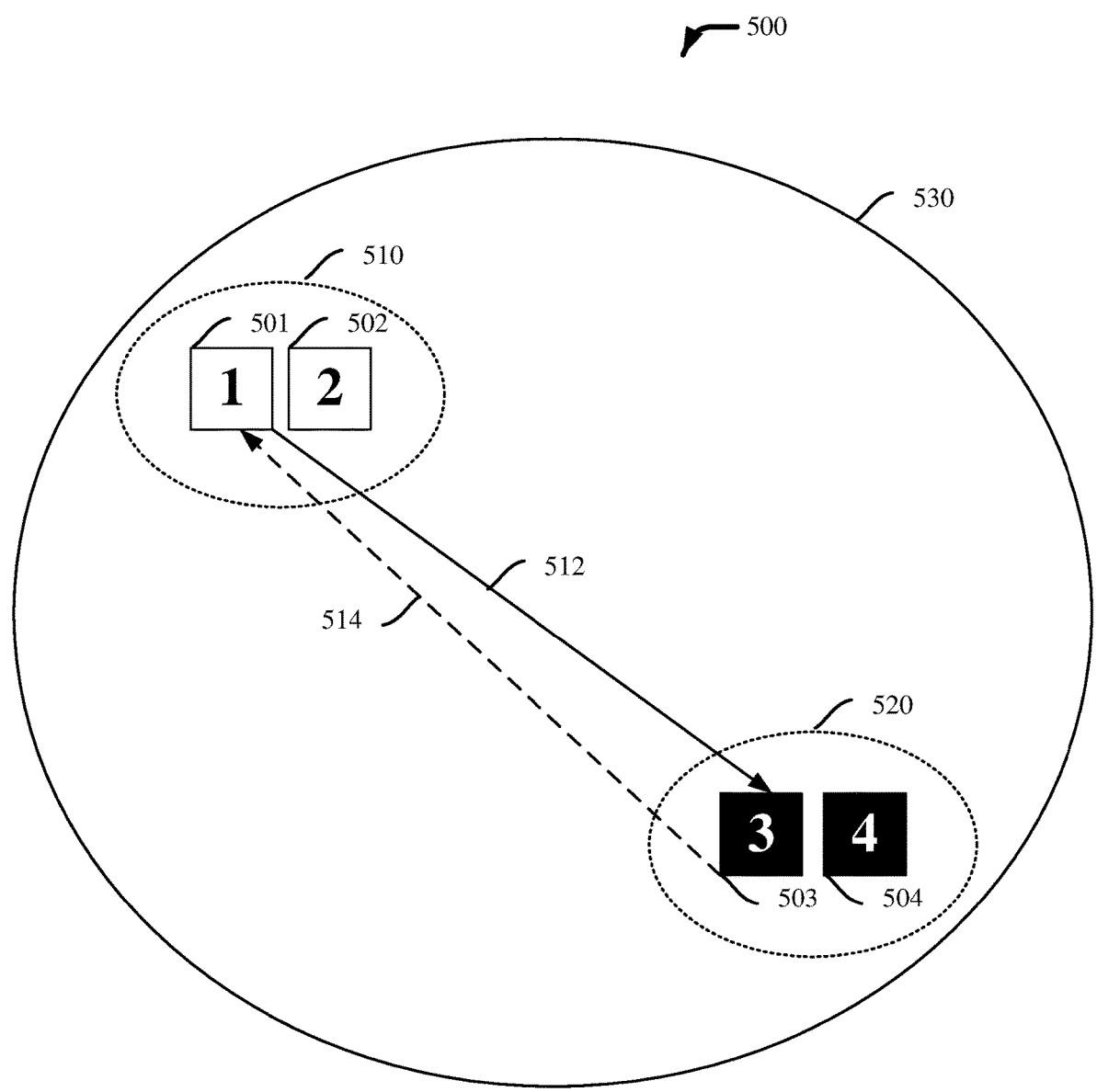

FIGS. 4 and 5 illustrate block diagrams of example, non-limiting merge operations facilitating extended group service changes in accordance with one or more embodiments described herein. As previously described in FIG. 2, all the node devices can send its service states to all the new nodes, individually. FIGS. 4 and 5 describe the messaging for service exchange between the nodes as a representative cluster rather than individually. For example, a node in a cluster can represent the cluster to send and/or receive service exchange messages. FIG. 4 illustrates node 1 device 401 and node 2 device 402 in cluster 410 merging with node 3 device 403 and node 4 device 404 in cluster 420 to form cluster 430. Node 1 device 401 can represent the nodes in cluster 410 and send its service state along with the service state of node 2 device 402 to node 3 device 403 and to node 4 device 404 as illustrated by arrow 412 and arrow 414, respectively. Similarly, node 3 device 403 can represent the nodes in cluster 420 and send its service state along with the service state of node 4 device 404 to node 1 device 401 and node 2 device 402 as illustrated by arrow 416 and arrow 418, respectively.

FIG. 5 illustrates node 1 device 501 and node 2 device 502 in cluster 510 merging with node 3 device 503 and node 4 device 504 in cluster 520 to form cluster 530. Node 1 device 501 can represent the nodes in cluster 510 to both send and receive service states between cluster 510 and cluster 520. Node 3 device 503 can represent the nodes in cluster 520 to both send and receive service states between cluster 510 and cluster 520. Node 1 device 501 can send its service state along with the service state of node 2 device 502 to node 3 device 503. Node 3 device 503 can receive the service state from node 1 device 501 for all the nodes in its cluster 520. The service exchange messaging from node 1 device 501 to node 3 device 503 can be represented by arrow 512. Similarly, node 3 device 503 can send its service state along with the service state of node 4 device 504 to node 1 device 501. Node 1 device 501 can receive the service state from node 3 device 503 for all the nodes in its cluster 510. The service exchange messaging from node 3 device 503 to node 1 device 501 can be represented by arrow 514.

Figure 6:
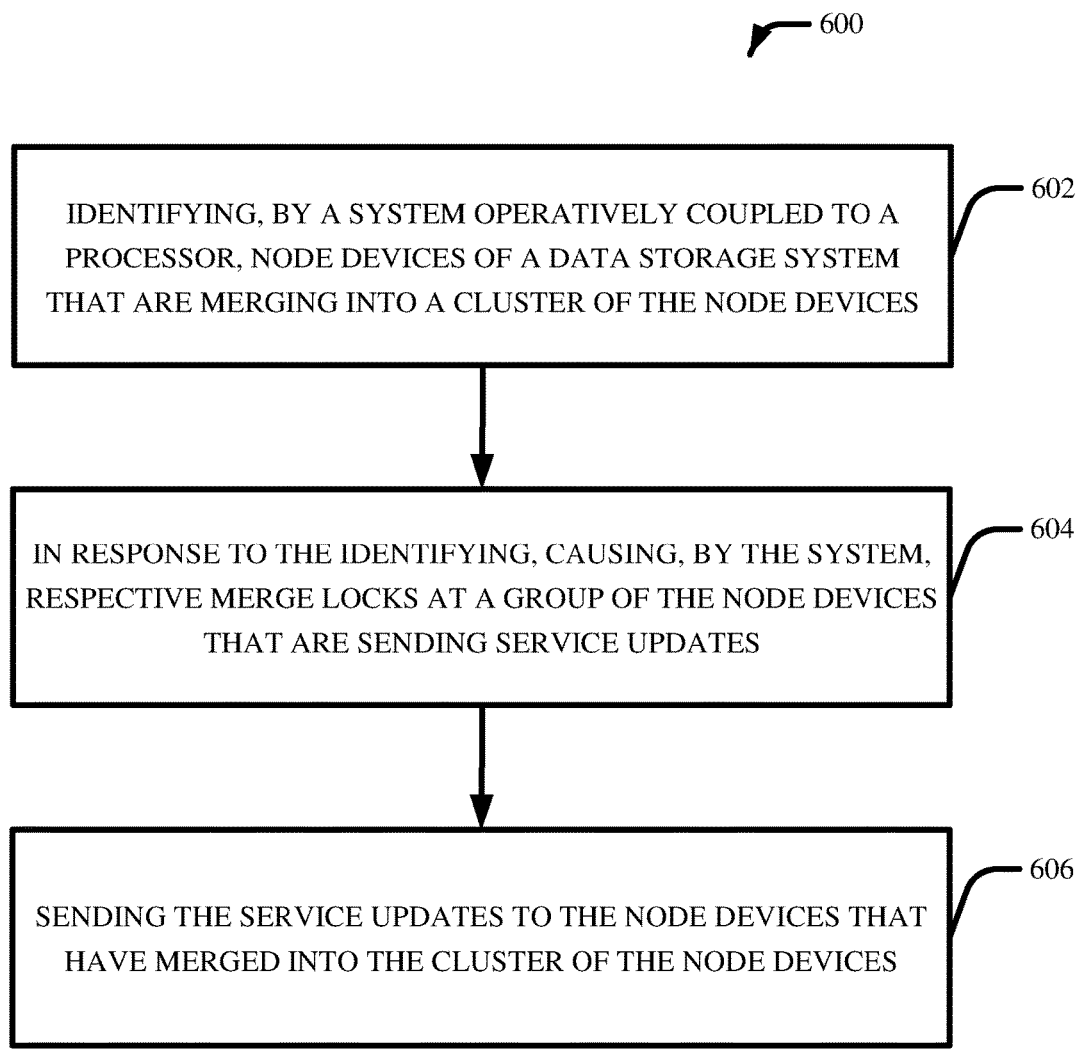
FIGS. 6-9 illustrate flow diagrams of example, non-limiting methods facilitating extended group service changes in accordance with one or more embodiments described herein.

FIG. 6 illustrates a flow diagram of an example, non-limiting method 600 facilitating extended group service changes in accordance with one or more embodiments described herein. At 602, the method 600 can comprise identifying, by a system operatively coupled to a processor, node devices of a data storage system that are merging into a cluster of the node devices. At 604, the method 600 can further comprise, in response to the identifying, causing, by the system, respective merge locks (e.g., exclusive merge locks) at a group of the node devices that are sending service updates. At 606, the method 600 can further comprise, sending the service updates to the node devices that have merged into the cluster of the node devices.

Figure 7:
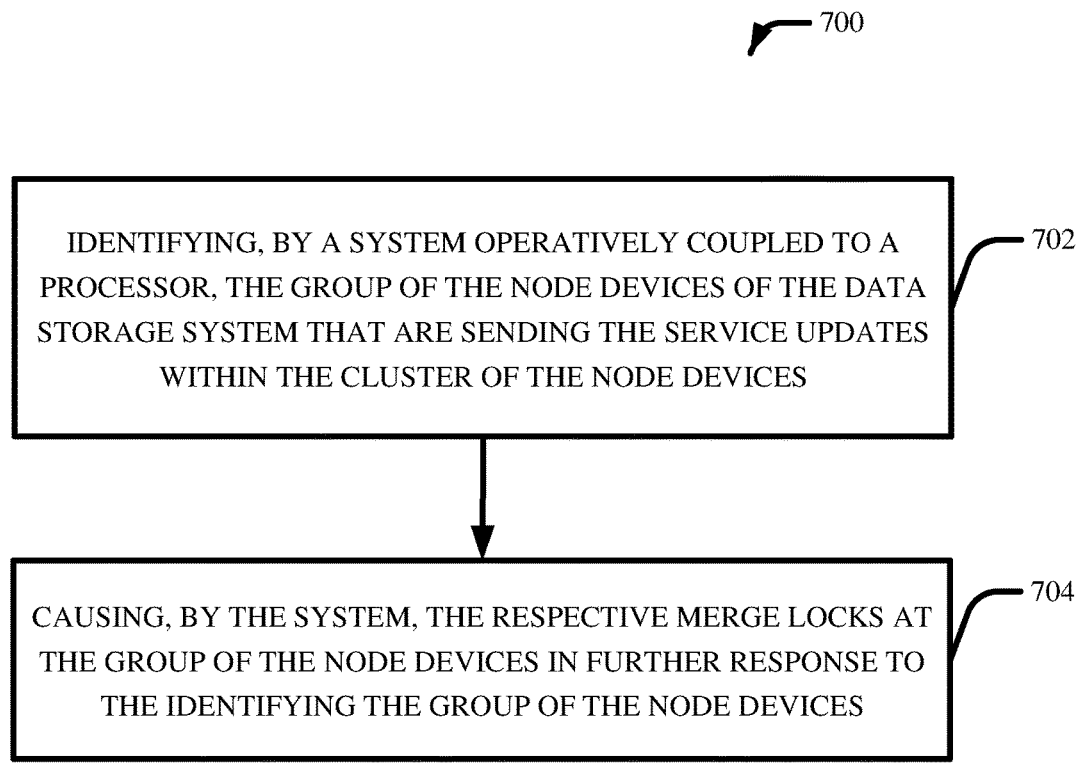

FIG. 7 illustrates a flow diagram of an example, non-limiting method 700 facilitating extended group service changes in accordance with one or more embodiments described herein. At 702, the method 700 can comprise identifying, by a system operatively coupled to a processor, the group of the node devices of the data storage system that are sending the service updates within the cluster of the node devices. At 704, the method 700 can further comprise causing, by the system, the respective merge locks (e.g., shared merge locks) at the group of the node devices in further response to the identifying the group of the node devices.

Figure 8:
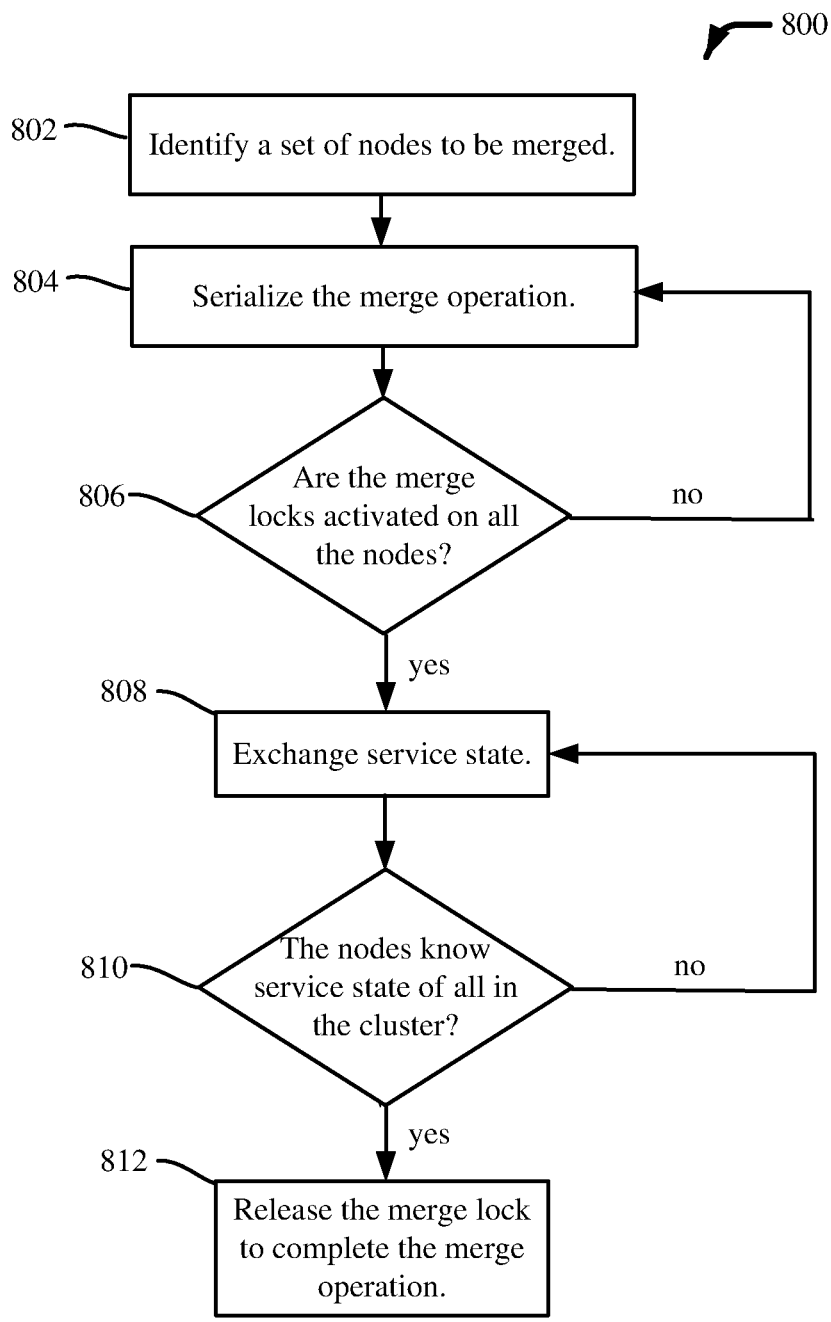

FIG. 8 illustrates a flow diagram of an example, non-limiting method 800 facilitating extended group service changes in accordance with one or more embodiments described herein. At 802, the method 800 can comprise identifying a set of nodes to be merged. At 804, the method 800 can further comprise serializing the merge operation. At 806, the method 800 can further comprise determining whether the exclusive merge locks are activated on all the nodes. If no, continue at 804. If yes, proceed to 808. At 808, the method 800 can further comprise exchanging service state. At 810, the method 800 can further comprise determining whether all the nodes know the service state of all the nodes in the cluster. If no, continue at 808. If yes, proceed to 812. At 812, the method 800 can further comprise releasing the exclusive merge locks to complete the merge operation.

Figure 9:
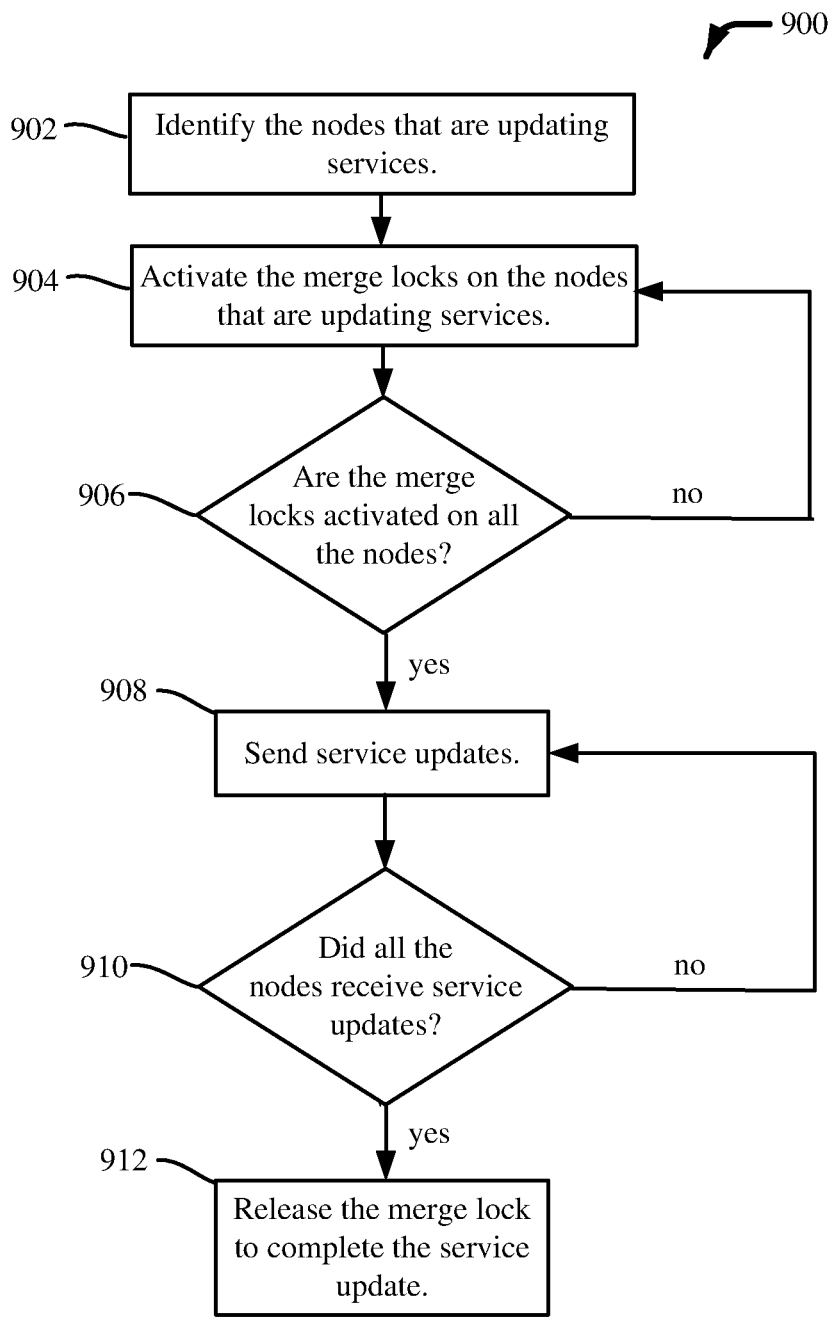

FIG. 9 illustrates a flow diagram of an example, non-limiting method 900 facilitating extended group service changes in accordance with one or more embodiments described herein. At 902, the method 900 can further comprise identifying the initiator node devices that are updating services. At 904, the method 900 can further comprise activating the shared merge locks on the initiator node devices that are updating services. At 906, the method 900 can further comprise determining whether the shared merge locks are activated on all the node devices that are initiating service updates. If no, continue at 904. If yes, proceed to 908. At 908, the method 900 can further comprise sending service updates to participant node devices. At 910, the method 900 can further comprise determining whether all the participant node devices received service updates. If no, continue at 908. If yes, proceed to 912. At 912, the method 900 can further comprise releasing the shared merge locks to complete the service updates.

Figure 10:
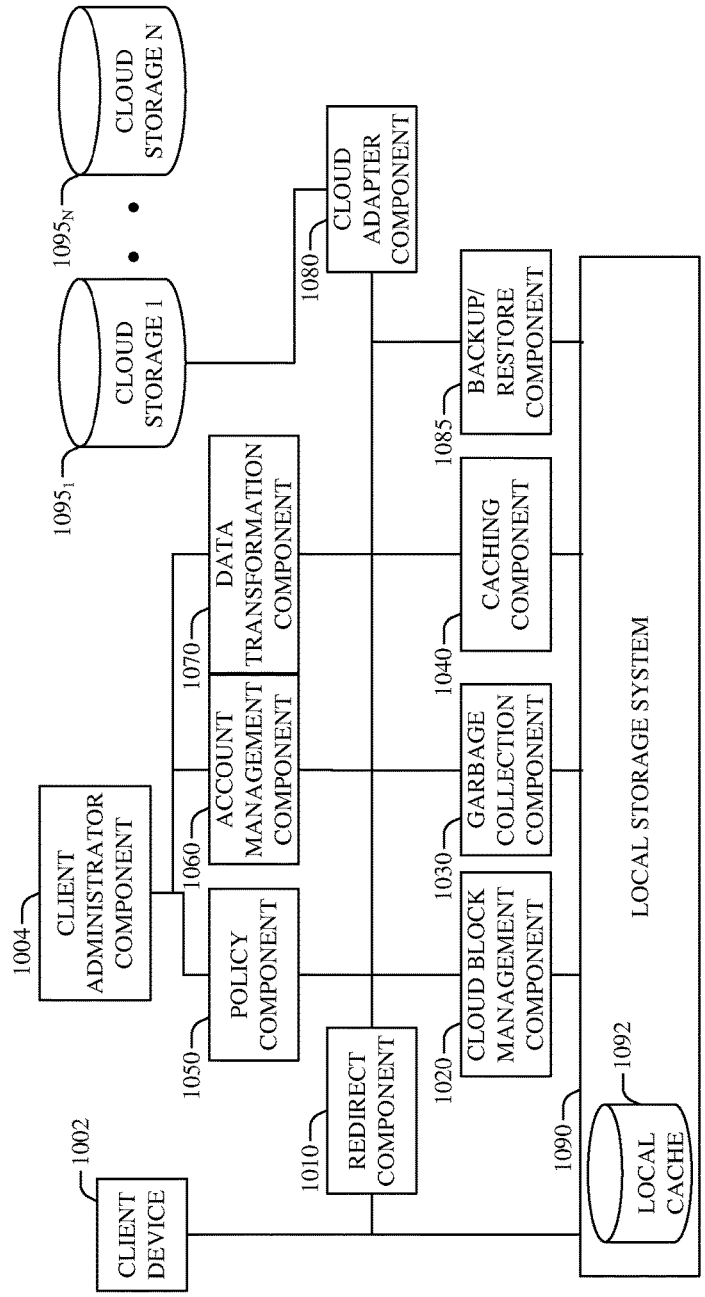
FIG. 10 illustrates a block diagram of an example distributed file storage system that employs tiered cloud storage in accordance with one or more embodiments described herein.
Figure 11:
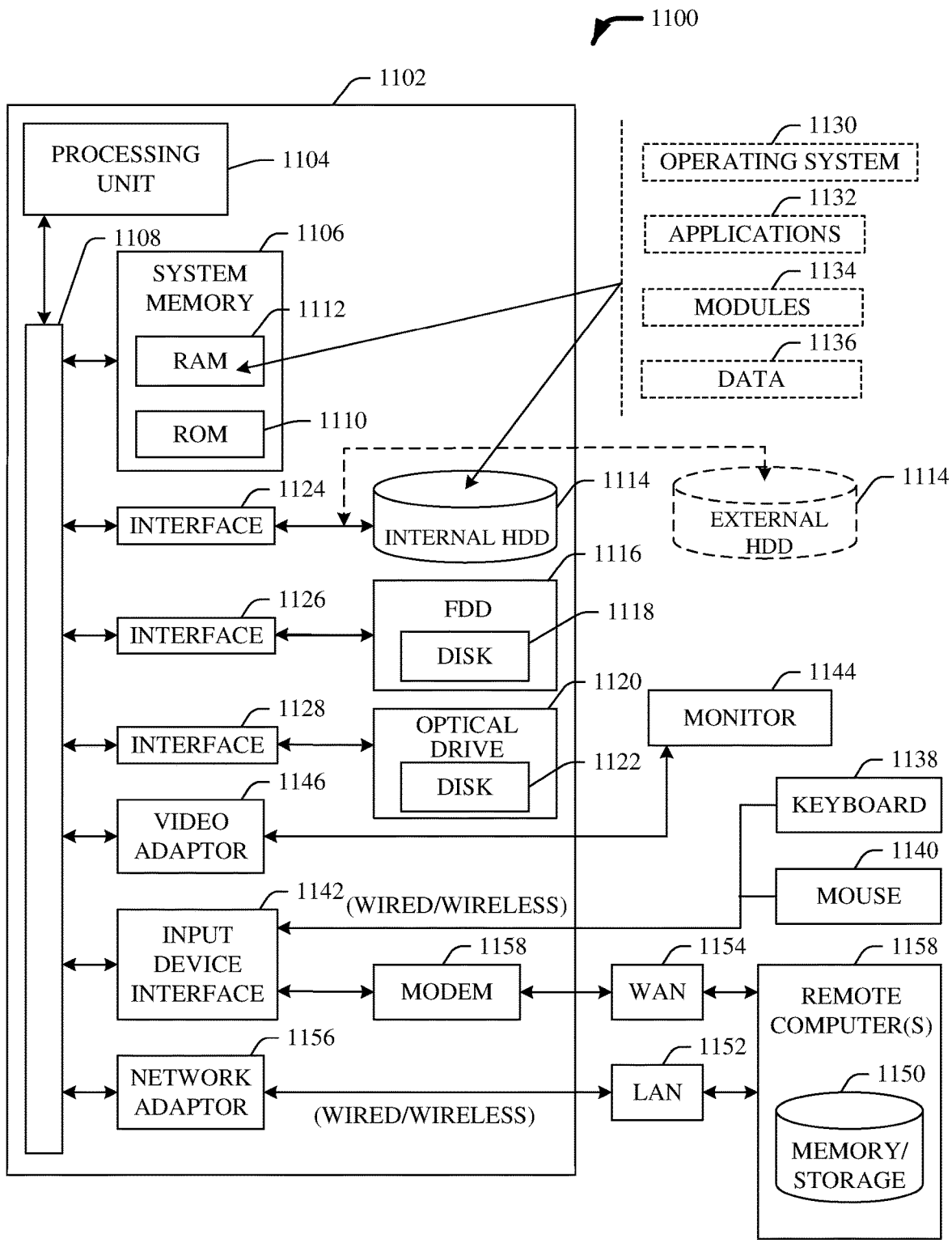
FIG. 11 illustrates an example block diagram of a computer operable to execute one or more embodiments described herein.

To provide further context for various aspects of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with one or more aspects described herein. For example, aspects of distributed storage system 1000 and computer 1102 can be used to implement server 102 of FIG. 1, and aspects of computer 1102 can be used to implement client computer 104a and client computer 104b of FIG. 1.

Referring now to FIG. 10, there is illustrated an example local storage system including cloud tiering components and a cloud storage location in accordance with one or more implementations described herein. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 can use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 and cloud storage N, where N is a positive integer. It can be appreciated that multiple cloud storage locations can be used for storage including multiple accounts within a single cloud storage location as more fully described in implementations of this disclosure. Further, a backup/restore component 1085 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete Mode and extended attributes of the file, can be still stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on list of mappings it manages. For example, each stub can be associated with an account, and the cloud block management component 1020 can aggregate information from a set of stubs associated with the same account. Other example statistics that can be maintained include the number of recalls, the number of writes, the number of modifications, the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of APIs. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include cloud metadata objects (CMOs), cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data can be represented by clear, adding existing file information to the cache can be represented by fill, adding new information to the cache by write, reading information from the cache can be represented by read following a fill, updating existing file information to the cache can be represented by fill followed by a write, and truncating cache due to file operation can be represented by sync and then a partial clear.

In one implementation, the caching component 1040 can track any operations performed on the cache. For example, any operation touching the cache can be added to a queue prior to the corresponding operation being performed on the cache. For example, before a fill operation, an entry can be placed on an invalidate queue as the file and/or regions of the file will be transitioning from an uncached state to cached state. In another example, before a write operation, an entry can be placed on a synchronization list as the file and/or regions of the file will be transitioning from cached to cached-dirty. A flag can be associated with the file and/or regions of the file to show that it has been placed in a queue, and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be requeued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream (ADS). It can be appreciated that ADS can be based on the New Technology File System (NTFS) ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; and (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached," the region can be filled; (7) the cache tracking tree can be updated to mark the cache region as dirty; (8) the data can be written to the cache region; and (9) the lock can be deactivated.

In one implementation, data can be cached at the time of a first read. For example, if the state associated with the data range called for in a read operation is non-cached, then this can be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 1085 can transfer a copy of the files within the local storage system 1090 to another cluster (e.g., target cluster). Further, the backup/restore component 1085 can manage synchronization between the local storage system 1090 and the other cluster, such that, the other cluster is timely updated with new and/or modified content within the local storage system 1090.

FIG. 11 illustrates a block diagram of a computer 1102 operable to execute the disclosed communication architecture. To provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read-only memory (ROM), electrically erasable programmable read-only memory (EEPROM), flash memory or other memory technology, compact disc read only memory (CD-ROM), digital versatile disc (DVD; sometimes referred to as digital video disc) or other optical disc storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals can refer to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 11, the example environment 1100 for implementing various aspects of the specification includes a computer 1102, the computer 1102 including a processing unit 1104, a system memory 1106 and a system bus 1108. As an example, the component(s), server(s), node(s), cluster(s), system(s), and/or device(s) disclosed herein can each include at least a portion of the computer 1102. The system bus 1108 can couple system components including, but not limited to, the system memory 1106 to the processing unit 1104. The processing unit 1104 can be any of various commercially-available or custom processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 can include ROM 1110 and RAM 1112. A basic input/output system (BIOS) can be stored in a non-volatile memory 1110 such as ROM, erasable programmable read-only memory (EPROM), EEPROM, where the BIOS can contain the basic routines that help to transfer information between elements within the computer 1102, such as during startup. The RAM 1112 can also include a high-speed RAM such as static RAM for caching data, or NVRAM.

The computer 1102 further includes an internal hard disk drive (HDD) 1114, which internal hard disk drive 1114 can also be configured for external use in a suitable chassis (not shown), a magnetic floppy disk drive (FDD) 1116, (e.g., to read from or write to a removable diskette 1118) and an optical disc drive 1120, (e.g., reading a CD-ROM disc 1122 or, to read from or write to other high capacity optical media such as the DVD). The hard disk drive 1114, magnetic disk drive 1116 and optical disc drive 1120 can be connected to the system bus 1108 by a hard disk drive interface 1124, a magnetic disk drive interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the subject disclosure.

The drives and their associated computer-readable storage media can provide nonvolatile storage of data, data structures, computer-executable instructions, and so forth. For the computer 1102, the drives and storage media can accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

Many program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired or wireless input devices, e.g., a keyboard 1138 and/or a pointing device, such as a mouse 1140 or a touch screen or touchpad (not illustrated). These and other input devices can be connected to the processing unit 1104 through an input device interface 1142 that is coupled to the system bus 1108, but can be connected by other interfaces, such as a parallel port, an IEEE 1394 port, a game port, a USB port, an infrared (IR) interface, etc. A monitor 1144 or other type of display device can also be connected to the system bus 1108 via an interface, such as a video adapter 1146.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and can include many or all the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments can be commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, can be connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., desktop and/or portable computer, server, communications satellite, etc. This includes at least Wireless Fidelity (Wi-Fi) and BLUETOOTH wireless technologies. Thus, the communication can be a predefined structure as with a conventional network or simply an ad hoc communication between at least two devices.

Wi-Fi can allow a connection to the Internet from a couch at home, a bed in a hotel room, or a conference room at work, without wires. Wi-Fi can be a wireless technology similar to that used in a cell phone that enables such devices, e.g., computers, to send and receive data indoors and out; anywhere within the range of a base station. Wi-Fi networks can use radio technologies called IEEE 802.11 (a, b, g, n, etc.) to provide secure, reliable, fast wireless connectivity. A Wi-Fi network can be used to connect computers to each other, to the Internet, and to wired networks (which can use an IEEE 802.3 standard or Ethernet). Wi-Fi networks can operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
 a processor; and
 a memory that stores executable instructions that, when executed by the processor, facilitate performance of operations, comprising:
  identifying a first group of node devices of a data storage system that are merging into a cluster comprising a second group of the node devices; and
  in response to the identifying, causing respective merge locks at node devices of the second group of the node devices that prevent sending of service updates between the node devices of the second group of the node devices until the merging is completed, wherein the respective service updates comprise updated states of services running on the node devices of the second group of the node devices.

2. The system of claim 1, wherein the causing the respective merge locks comprises facilitating respective initiation of the respective merge locks at the node devices of the second group of the node devices.

3. The system of claim 1, wherein the node devices of the second group of the node devices send the service updates independently.

4. The system of claim 1, further comprising identifying the node devices of the second group of the node devices of the data storage system that are sending the service updates.

5. The system of claim 1, wherein the operations further comprise causing, during the respective merge locks, respective node devices of the first group of the node devices to send first service updates to the node devices of the second group of the node devices.

6. The system of claim 1, wherein the operations further comprise causing, during the respective merge locks, respective node devices of the second group of the node devices to send first service updates to node devices of the first group of the node devices.

7. The system of claim 1, wherein the operations further comprise splitting a third group of the node devices from the cluster of the node devices.

8. A method, comprising:
identifying, by a system operatively coupled to a processor, a first group of node devices of a data storage system that are merging into a cluster comprising a second group of the node devices; and
in response to the identifying, causing, by the system, respective merge locks node devices of the second group of the node devices that prevent sending of service updates between the node devices of the second group of the node devices until the merging is completed, wherein the respective service updates comprise updated states of services running on the node devices of the second group of the node devices.

9. The method of claim 8, wherein the causing the respective merge locks comprises facilitating respective initiation of the respective merge locks at the node devices of the second group of the node devices.

10. The method of claim 8, wherein the node devices of the second group of the node devices send the service updates independently.

11. The method of claim 8, further comprising identifying, by the system, the node devices of the second group of the node devices of the data storage system that are sending the service updates.

12. The method of claim 11, further comprising causing, by the system during the respective merge locks, respective node devices of the first group of the node devices to send first service updates to the node devices of the second group of the node devices.

13. The method of claim 8, further comprising causing, during the respective merge locks, respective node devices of the second group of the node devices to send first service updates to node devices of the first group of the node devices.

14. The method of claim 8, wherein the method further comprises splitting, by the system, a third group of the node devices from the cluster of the node devices.

15. A computer program product comprising a non-transitory computer readable storage medium having program instructions embodied therewith, the program instructions executable by a processor to cause the processor to at least:
identify a first group of node devices of a data storage system that are merging into a cluster comprising a second group of the node devices; and
in response to the identifying, cause respective merge locks node devices of the second group of the node devices that prevent sending of service updates between the node devices of the second group of the node devices until the merging is completed, wherein the respective service updates comprise updated states of services running on the node devices of the second group of the node devices.

16. The computer program product of claim 15, wherein the node devices of the second group of the node devices send the service updates independently.

17. The computer program product of claim 15, wherein the program instructions are further executable by the processor to cause the processor to identify the node devices of the second group of the node devices of the data storage system that are sending the service updates.

18. The computer program product of claim 15, wherein the program instructions are further executable by the processor to cause, during the respective merge locks, respective node devices of the first group of the node devices to send first service updates to the node devices of the second group of the node devices.

19. The computer program product of claim 15, wherein the program instructions are further executable by the processor to cause, during the respective merge locks, respective node devices of the second group of the node devices to send first service updates to node devices of the first group of the node devices.

20. The computer program product of claim 15, wherein the program instructions are further executable by the processor to cause the processor to:
split a third group of the node devices from the cluster of the node devices.

* * * * *